United States Patent
Xia

(10) Patent No.: US 9,258,777 B2
(45) Date of Patent: Feb. 9, 2016

(54) METHOD, APPARATUS, AND NETWORK MANAGEMENT SYSTEM FOR ACQUIRING AN ENERGY EFFICIENCY PARAMETER OF A NETWORK WITH OVERLAID COVERAGE

(71) Applicant: Huawei Technologies Co., Ltd., Shenzhen, Guangdong (CN)

(72) Inventor: Haitao Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/615,692

(22) Filed: Feb. 6, 2015

(65) Prior Publication Data

US 2015/0156714 A1 Jun. 4, 2015

Related U.S. Application Data

(63) Continuation of application No. PCT/CN2012/079738, filed on Aug. 6, 2012.

(51) Int. Cl.
*H04W 52/02* (2009.01)
*H04W 24/08* (2009.01)

(52) U.S. Cl.
CPC .......... *H04W 52/0203* (2013.01); *H04W 24/08* (2013.01); *Y02B 60/50* (2013.01)

(58) Field of Classification Search
CPC .................................................... H04W 52/02
See application file for complete search history.

(56) References Cited

U.S. PATENT DOCUMENTS 7,277,414 B2 * 10/2007 Younis ................... G01D 9/005
370/311
8,458,498 B2 * 6/2013 Rotem ................... G06F 1/3203
713/320

(Continued)

FOREIGN PATENT DOCUMENTS

CN 101841859 A 9/2010
CN 101931986 A 12/2010

(Continued)

OTHER PUBLICATIONS

"Environmental Engineering (EE) Measurement Method for Energy Efficiency of Wireless Access Network Equipment," ETSI TS 102 706, V1.2.1, pp. 1-53, European Telecommunications Standards Institute, Valbonne, France (Oct. 2011).

(Continued)

*Primary Examiner* — Michael T Vu
(74) *Attorney, Agent, or Firm* — Leydig, Voit & Mayer, Ltd.

(57) ABSTRACT

The present invention provides a method, an apparatus, and a network management system for acquiring an energy efficiency parameter of a network with overlaid coverage, and a radio access network device and a communication system. The network management system can acquire, via the radio access network device, the performance measurement parameter of the target cell in the energy efficiency measurement area and the energy consumption value of the radio access network device to which the target cell in the energy efficiency measurement area belongs, then the network management system further acquires the energy efficiency parameter of the energy efficiency measurement area in the network with overlaid coverage, so as to help an operator with accurately learning about the actual gain brought by the cell energy saving use case.

18 Claims, 5 Drawing Sheets

(56) References Cited

U.S. PATENT DOCUMENTS

| | | |
|---|---|---|
| 2009/0070447 A1 | 3/2009 | Jubinville et al. |
| 2010/0022263 A1 | 1/2010 | Stamoulis et al. |
| 2011/0059763 A1 | 3/2011 | Yoshiuchi et al. |
| 2011/0096687 A1 | 4/2011 | Döttling et al. |
| 2011/0111752 A1 | 5/2011 | Catovic et al. |
| 2012/0157002 A1* | 6/2012 | Choi .............. H04W 52/0206 455/67.11 |
| 2013/0151700 A1 | 6/2013 | Liu et al. |

FOREIGN PATENT DOCUMENTS

| | | |
|---|---|---|
| CN | 102186209 A | 9/2011 |
| CN | 102571854 A | 7/2012 |
| WO | 2056628 A1 | 5/2009 |
| WO | WO 2011096867 A1 | 8/2011 |
| WO | WO 2011103186 A2 | 8/2011 |

OTHER PUBLICATIONS

"3$^{rd}$ Generation Partnership Project; Technical Specification Group Services and System Aspects; Telecommunication Management; Energy Saving Management (ESM); Concepts and Requirements (Release 11)," 3GPP TS 32.551, V11.1.0, pp. 1-25, 3$^{rd}$ Generation Partnership Project, Valbonne, France (Jun. 2012).

"3$^{rd}$ Generation Partnership Project; Technical Specification Group Services and System Aspects; Telecommunication Management; Key Performance Indicators (KPI) for Evolved Universal Terrestrial Radio Access Network (E-UTRAN); Requirements (Release 10)," 3GPP TS 32.451, V10.0.0, pp. 1-13, 3$^{rd}$ Generation Partnership Project, Valbonne, France (Mar. 2011).

"3$^{rd}$ Generation Partnership Project; Technical Specification Group Services and System Aspects; Telecommunication Management; Key Performance Indicators (KPI) for Evolved Universal Terrestrial Radio Access Network (E-UTRAN): Definitions (Release 10)," 3GPP TS 32.450, V10.1.0, pp. 1-17, 3$^{rd}$ Generation Partnership Project, Valbonne, France (Jun. 2011).

"3$^{rd}$ Generation Partnership Project; Technical Specification Group Services and System Aspects; Telecommunication Management; Performance Management (PM); Performance Measurements Evolved Universal Terrestrial Radio Access Network (E-UTRAN) (Release 11)," 3GPP TS 32.425, V11.3.0, pp. 1-70, 3$^{rd}$ Generation Partnership Project, Valbonne, France (Jun. 2012).

\* cited by examiner

METHOD, APPARATUS, AND NETWORK MANAGEMENT SYSTEM FOR ACQUIRING AN ENERGY EFFICIENCY PARAMETER OF A NETWORK WITH OVERLAID COVERAGE

CROSS-REFERENCE TO RELATED APPLICATIONS

This application is a continuation of International Patent Application No. PCT/CN2012/079738, filed on Aug. 6, 2012, which is hereby incorporated by reference in its entirety.

TECHNICAL FIELD

The present invention relates to communication technologies and, in particular, to a method, an apparatus, and a network management system for acquiring an energy efficiency parameter of a network with overlaid coverage.

BACKGROUND

In communication networks, network energy efficiency is a key performance indicator (hereinafter referred to as KPI) to measure a useful output of network unit energy consumption. Currently, for a measurement method and an assessment mode of the network energy efficiency, the energy efficiency (hereinafter referred to as EE) project of European telecommunications standards institute (hereinafter referred to as ETSI) has performed modeling and analysis to base station equipments in a radio access network (hereinafter referred to as RAN), and a method for measuring the energy consumption on the network equipment level and site-level, as well as an energy efficiency assessment mode on the network level are proposed. The ETSI also defines that the network energy efficiency is a relationship between the energy consumption and the useful output of the energy consumption. With the growth in the number of users and the rapid growth in data services, operators are increasingly attaching importance to a status of the network energy efficiency.

Two kinds of cell-level energy saving use cases are proposed in the 3GPP, one for a cell overlaid and the other one for capacity limited network (they are collectively referred to as a network with overlaid coverage), and there is no specific method in the prior art to assess the energy efficiency KPI for these cell-level energy saving use cases, so the operators can not know the actual gain of the energy efficiency brought by the cell energy saving.

SUMMARY

Embodiments of the present invention provide a method, an apparatus, and a network management system for acquiring an energy efficiency parameter of a network with overlaid coverage, as well as a radio access network device and a communication system.

A method for acquiring an energy efficiency parameter of a network with overlaid coverage provided by embodiments of the present invention includes:

acquiring, by a network management system, a performance measurement parameter of a target cell in an energy efficiency measurement area and an energy consumption value of a radio access network device to which the target cell in the energy efficiency measurement area belongs; and acquiring, by the network management system, an energy efficiency parameter of the energy efficiency measurement area according to the performance measurement parameter of the target cell in the energy efficiency measurement area and the energy consumption value of the radio access network device to which the target cell in the energy efficiency measurement area belongs.

A method for acquiring an energy efficiency parameter of a network with overlaid coverage provided by embodiments of the present invention includes:

receiving, by a radio access network device, a measurement instruction sent by the network management system, the measurement instruction is used to instruct the radio access network device to measure a performance measurement parameter of a target cell in an energy efficiency measurement area in an energy efficiency measurement period, and an energy consumption value of the radio access network device in the energy efficiency measurement period;

acquiring, by the radio access network device, the performance measurement parameter of the target cell in the energy efficiency measurement area in the energy efficiency measurement period and the energy consumption value in the energy efficiency measurement period of the radio access network device, and reporting them to the network management system.

A network management system provided by embodiments of the present invention includes:

a first acquiring unit, configured to acquire, by the network management system, a performance measurement parameter of a target cell in an energy efficiency measurement area and an energy consumption value of a radio access network device to which the target cell in the energy efficiency measurement area belongs;

a second acquiring unit, configured to acquire an energy efficiency parameter of the energy efficiency measurement area according to the performance measurement parameter of the target cell in the energy efficiency measurement area and the energy consumption value of the radio access network device to which the target cell in the energy efficiency measurement area belongs.

A radio access network device provided by embodiments of the present invention includes:

a first receiving unit, configured to receive, by the radio access network device, a measurement instruction sent by a network management system, the measurement instruction is used to instruct the radio access network device to measure a performance measurement parameter of a target cell in an energy efficiency measurement area in an energy efficiency measurement period and an energy consumption value in the energy efficiency measurement period of the radio access network device; and a first sending unit, configured to acquire, by the radio access network device, the performance measurement parameter of the target cell in the energy efficiency measurement area in the energy efficiency measurement period and the energy consumption value of the radio access network device in the energy efficiency measurement period, and report the performance measurement parameter of the target cell in the energy efficiency measurement area in the energy efficiency measurement period and the energy consumption value of the radio access network device in the energy efficiency measurement period to the network management system.

A communication system provided by embodiments of the present invention, includes the above mentioned network management system, and the above mentioned radio access network device.

Embodiments of the present invention provide a method, an apparatus, and a network management system for acquiring an energy efficiency parameter of a network with overlaid coverage, and a radio access network device and a communications system. The network management system can acquire, via the radio access network device, the performance measurement parameter of the target cell in the energy efficiency measurement area and the energy consumption value of the radio access network device to which the target cell in the energy efficiency measurement area belongs, then the network management system further acquires the energy efficiency parameter of the energy efficiency measurement area in the network with overlaid coverage, so as to help an operator with accurately learning about the actual gain brought by the cell energy saving use case.

BRIEF DESCRIPTION OF DRAWINGS

To describe the technical solutions in embodiments of the present invention or in the prior art more clearly, the following briefly introduces the accompanying drawings needed for describing the embodiments or the prior art. Apparently, the accompanying drawings in the following description illustrate merely some embodiments of the present invention, and persons of ordinary skill in the art may still derive other drawings from these accompanying drawings without creative effort.

DESCRIPTION OF EMBODIMENTS

The following clearly and comprehensively describes the technical solutions in embodiments of the present invention with reference to the accompanying drawings in embodiments of the present invention. Apparently, the described embodiments are merely part of embodiments of the present invention rather than all of the embodiments. All other embodiments obtained by persons of ordinary skill in the art based on the embodiments of the present invention without creative effort shall fall within the protection scope of the present invention.

In the embodiments of the present invention, acquiring an energy efficiency parameter is performed mainly on account of the two cell-level energy saving use cases proposed in the third generation partnership project (3rd Generation Partnership Project, hereinafter referred to as 3GPP). These two cell-level energy saving use cases are respectively aimed at cell overlaid and capacity limited network, which are collectively referred to as a network with overlaid coverage. There is a common feature of these two energy saving use cases, which is that, when the cell enters an energy saving condition, another cell around the cell is needed to provide coverage support for it. That is, the cell which provides the coverage support can continue to provide a service to the former user of the cell which enters the energy saving condition. In the energy saving use case for the cell overlaid, the cell which provides the coverage support and the energy saving cell are in a static cell relationship pre-generated in a network planning and deployment stage, while in the energy saving use case for the capacity limited network, the cell which provides the coverage support and the energy saving cell are in a dynamic cell relationship generated by an energy saving compensation operation during an energy saving process.

Figure 1:
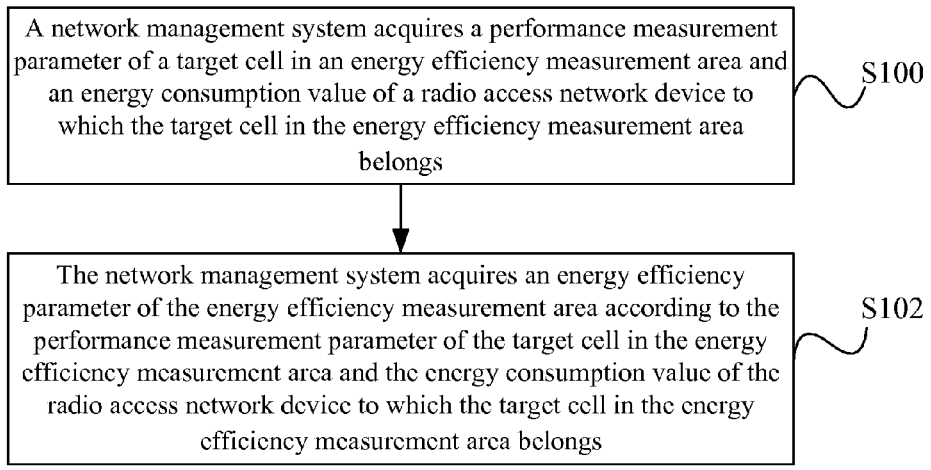
FIG. 1 is a schematic flowchart of a method for acquiring an energy efficiency parameter by a network management system in a network with overlaid coverage provided by embodiments of the present invention.

FIG. 1 is a schematic flowchart of a method for acquiring an energy efficiency parameter by a network management system in a network with overlaid coverage provided by the embodiments of the present invention, which includes the following steps:

S100, the network management system acquires a performance measurement parameter of a target cell in an energy efficiency measurement area and an energy consumption value of a radio access network device to which the target cell in the energy efficiency measurement area belongs.

S102, The network management system acquires an energy efficiency parameter of the energy efficiency measurement area according to the performance measurement parameter of the target cell in the energy efficiency measurement area and the energy consumption value of the radio access network device to which the target cell in the energy efficiency measurement area belongs.

The method for acquiring the energy efficiency parameter for the cell energy saving use case provided by the embodiment of the present invention, may be used to compare and assess the energy consumption values of the radio access network device to which the target cell belongs and the useful outputs of the network performance of the target cell in the energy efficiency measurement area before and after the energy saving switch function of the cell is turned on, so as to help the operator with learning about the actual gain brought by the cell energy saving use case.

Figure 2:
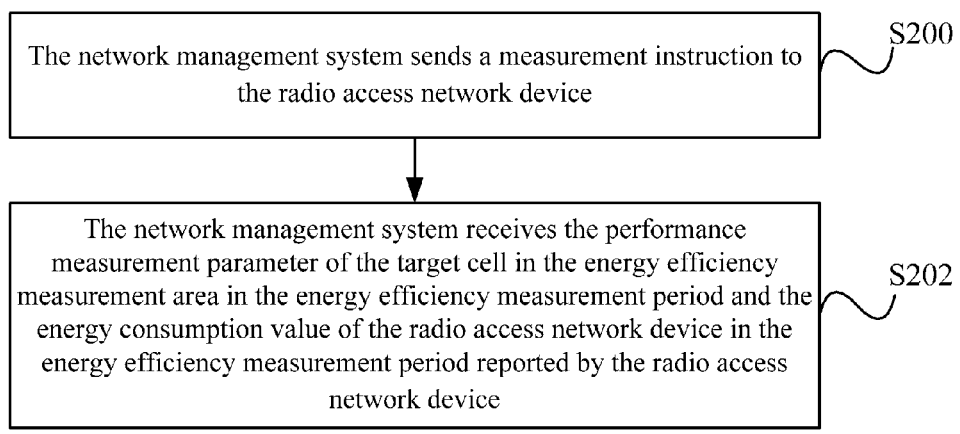
FIG. 2 is a schematic flowchart of a method for acquiring an energy efficiency parameter by a network management system in a network with overlaid coverage through a radio access network device provided by embodiments of the present invention.

FIG. 2 is a schematic flowchart of a method for acquiring an energy efficiency parameter by a network management system in a network with overlaid coverage through a radio access network device provided by embodiments of the present invention, which includes the following steps:

S200, The network management system sends a measurement instruction to the radio access network device, the measurement instruction is used to instruct the radio access network device to measure a performance measurement parameter of a target cell in an energy efficiency measurement area in an energy efficiency measurement period, and an energy consumption value of the radio access network device in the energy efficiency measurement period;

S202, The network management system receives the performance measurement parameter of the target cell in the energy efficiency measurement area in the energy efficiency measurement period and the energy consumption value of the radio access network device in the energy efficiency measurement period reported by the radio access network device.

Specifically, for the method for acquiring the energy efficiency parameter of the network with overlaid coverage, the performance measurement parameter of the cell in the energy efficiency measurement area includes a load parameter of the target cell in the energy efficiency measurement area, an inter-cell interference parameter among the target cells in the energy efficiency measurement area, or a traffic quality of service parameter of the target cell in the energy efficiency measurement area. The performance measurement parameter of the target cell in the energy efficiency measurement area may include any one or a combination of the above parameters. The radio access network device may be a macro base station or a micro base station, may also be a base station eNodeB in the LTE network, a base station NodeB in the UMTS network, or a base station BTS in the GSM network. It is not limited in this embodiment to the type of the network where the base station locates.

Among the performance measurement parameters, the load parameter of the target cell in the energy efficiency measurement area includes cell physical resource block usage (PRB usage) or composite available capacity (CAC). The cell energy saving use case of the network with overlaid coverage is usually applied when the target cell is in a low load condition, and the load parameter of the target cell is a cell load measured value under the low load condition.

Among the performance measurement parameters, the inter-cell interference parameter among the target cells in the energy efficiency measurement area includes any one or a combination of the following parameters:

An uplink interference overload indicator parameter (UL Interference Overload Indicator, hereinafter referred to as: OI), an uplink high interference indicator parameter (UL High Interference Indicator, hereinafter referred to as: HII), a relative narrowband transmit power indicator parameter (hereinafter referred to as: RNTP), or an almost blank subframe parameter (hereinafter referred to as: ABS).

Among the performance measurement parameters, the traffic quality of service parameter of the target cell in the energy efficiency measurement area includes any one or a combination of the following parameters:

A user throughput, a time delay, a packet loss rate, or the number of active users, wherein the user throughput may include any one or a combination of the following parameters: the worst 5% user throughput (5th percentile user throughput, reflecting the user throughput on the cell edge), the best 5% user throughput (95th percentile user throughput, reflecting the user throughput in the cell center), or the average user throughput (50th percentile user throughput).

Figure 3:
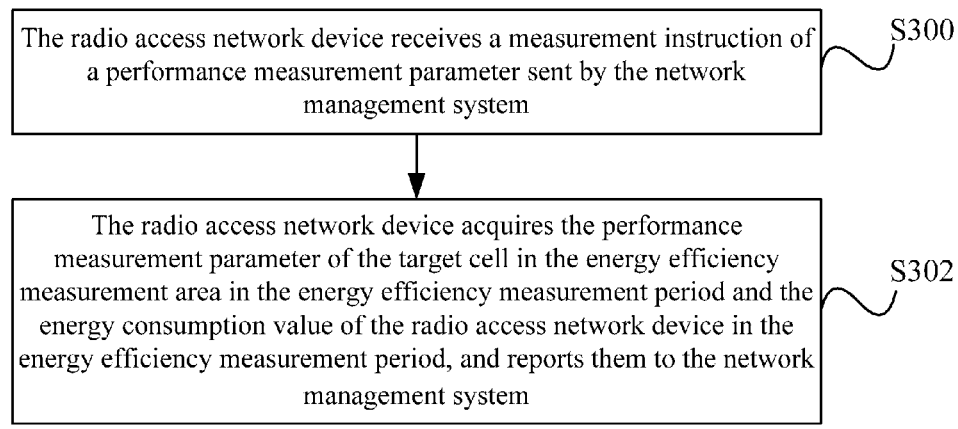
FIG. 3 is a schematic flowchart of a method for acquiring an energy efficiency parameter from a radio access network device side in a network with overlaid coverage provided by embodiments of the present invention.

FIG. 3 is a schematic flowchart of a method for acquiring an energy efficiency parameter from a radio access network device side in a network with overlaid coverage provided by embodiments of the present invention, which includes the following steps:

S300, The radio access network device receives a measurement instruction sent by a network management system, the measurement instruction is used to instruct the radio access network device to measure a performance measurement parameter of a target cell in an energy efficiency measurement area in an energy efficiency measurement period, and an energy consumption value of the radio access network device in the energy efficiency measurement period;

S302, The radio access network device acquires the performance measurement parameter of the target cell in the energy efficiency measurement area in the energy efficiency measurement period and the energy consumption value of the radio access network device in the energy efficiency measurement period, and reports them to the network management system.

Specifically, in the method of acquiring the energy consumption value of the radio access network device, an energy consumption monitoring module inside of the radio access network device may be used to collect and summate energy consumption values of each component modules or parts of the radio access network device in the energy efficiency measurement period, and obtain a combination of measurement results of the total energy consumption of the whole machine of the radio access network device; or a method of using plug-in power/energy consumption testing instrument may be applied, that is, the energy consumption value of the radio access network device in the energy efficiency measurement period is directly measured and collected by the instrument.

Embodiments of the present invention provide a method for effectively acquiring the energy efficiency parameter for the cell energy saving use case, in which the radio access network device starts to acquire the energy efficiency parameters in the energy efficiency measurement area after receiving the performance measurement instruction sent by the network management system, so as to help the operator which learning about the actual gain brought by the cell energy saving use case.

In the method for acquiring the energy efficiency parameter of the network with overlaid coverage provided by the embodiments of the present invention, the measurement instruction includes the energy efficiency measurement period, energy efficiency measurement area information, performance measurement parameter information, and an energy efficiency measurement start instruction; or it is preconfigured in the radio access network device the energy efficiency measurement period, the energy efficiency measurement area information, and the performance measurement parameter information. The performance measurement parameter information includes any one or a combination of the following parameters to be measured:

a load parameter of the target cell in the energy efficiency measurement area, an inter-cell interference parameter among the target cells in the energy efficiency measurement area, or a traffic quality of service parameter of the target cell in the energy efficiency measurement area.

Specifically, when the cell energy saving use case needs to measure the energy efficiency parameter, the radio access network device receives the measurement instruction sent by the network management system. The measurement instruction includes the energy efficiency measurement period, the energy efficiency measurement area information, the performance measurement parameter information, and the energy efficiency measurement start instruction. The radio access network device starts to perform the energy efficiency measurement according to the energy efficiency measurement start instruction. The energy efficiency measurement is to perform energy efficiency measurement to the parameters specified by the performance measurement parameter information in the specified energy efficiency measurement area according to the provided energy efficiency measurement period.

The energy efficiency measurement period, the energy efficiency measurement area information, and the performance measurement parameter information may also preset in the radio access network device, and when the radio access network device receives the measurement instruction sent by the network management system, the radio access network device starts the measurement according to the received energy efficiency measurement start instruction, and performs energy efficiency measurement to any one or a combination of the performance measurement parameters preset through the performance measurement parameter information in the specified energy efficiency measurement area according to the preset energy efficiency measurement period.

The following gives further description to the statement that the performance measurement parameter information includes any one or a combination of the parameters to be measured:

The performance measurement parameter to be measured in the embodiments of the invention may be any one of the three: the load parameter of the target cell in the energy efficiency measurement area, the inter-cell interference parameter among the target cells in the energy efficiency measurement area, or the quality of traffic service parameter of the target cell in the energy efficiency measurement area, may also be a combination of any two of them, or may include all of the three kinds of parameters.

For example, when the network management system only needs the energy consumption value based on the inter-cell interference parameter among the target cells in the energy efficiency measurement area, the network management system may set the performance measurement parameter to be measured to include only the inter-cell interference parameter among the target cells in the energy efficiency measurement area.

When the network management system needs the energy consumption value based on the inter-cell interference parameter among the target cells in the energy efficiency measurement area and the inter-cell interference parameter among the target cells in the energy efficiency measurement area, the network management system may set the performance measurement parameter to be measured to include the inter-cell interference parameter among the target cells in the energy efficiency measurement area and the traffic quality of service parameter of the target cell in the energy efficiency measurement area.

When the network management system needs the energy consumption value based on the load parameter of the target cell in the energy efficiency measurement area, the inter-cell interference parameter among the target cells in the energy efficiency measurement area or the traffic quality of service parameter of the target cell in the energy efficiency measurement area, the network management system may set the performance measurement parameter to be measured to include all the three kinds of parameters, that is, the load parameter of the target cell in the energy efficiency measurement area, the inter-cell interference parameter among the target cells in the energy efficiency measurement area or the traffic quality of service parameter of the target cell in the energy efficiency measurement area.

That is to say, in the case that the performance measurement parameter is sent to the radio access network device via the measurement instruction, any one or the combination of the performance measurement parameters may be chosen by the network management system by itself.

In the case that the performance measurement parameters are preset in the radio access network device, any one or the combination of the performance measurement parameters is determined by the specific type of the network. For example, when both of the energy saving cell and the cell which provides the coverage support belong to a same wireless access technology, the capability of providing service or the quality of the service of the two cells are the same, thus, in this case, the traffic quality of service parameter cannot be considered. Under this circumstance, the radio access network device may not set to measure the traffic quality of service parameter, that is, only the two parameters, the load parameter of the target cell in the energy efficiency measurement area and the inter-cell interference parameter among the target cells in the energy efficiency measurement area, are pre-set to be measured in the radio access network device.

Figure 4:
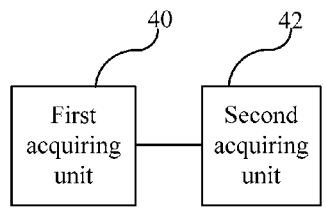
FIG. 4 is a schematic structural diagram of a network management system provided by embodiments of the present invention.

FIG. 4 is a schematic structural diagram of a network management system provided by embodiments of the present invention. Referring to FIG. 4, the network management system provided by the embodiments of the present invention includes a first acquiring unit 40 and a second acquiring unit 42, wherein the first acquiring unit 40 is configured to acquire, by the network management system, a performance measurement parameter of a target cell in an energy efficiency measurement area and an energy consumption value of a radio access network device to which the target cell in the energy efficiency measurement area belongs; and the second acquiring unit 42 is configured to acquire an energy efficiency parameter of the energy efficiency measurement area according to the performance measurement parameter of the target cell in the energy efficiency measurement area and the energy consumption value of the radio access network device to which the target cell in the energy efficiency measurement area belongs.

The network management system for effectively acquiring an energy efficiency parameter for the cell energy saving use case provided by the embodiments of the present invention uses the first acquiring unit to acquire the performance measurement parameter of the target cell in the energy efficiency measurement area and the energy consumption value of the radio access network device to which the target cell in the energy efficiency measurement area belongs, and uses the second acquiring unit to acquire the energy efficiency parameters of the energy efficiency measurement area of the network with overlaid coverage before and after the energy saving switch function of the cell is turned on, so as to help the operator with learning about the actual gain brought by the cell energy saving use case.

Figure 5:
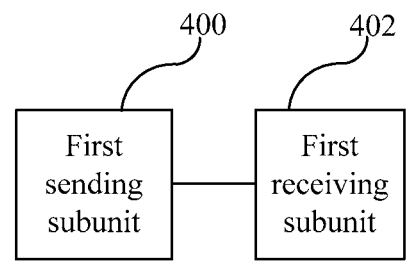
FIG. 5 is a schematic structural diagram of a first acquiring unit provided by embodiments of the present invention.

FIG. 5 is a schematic structural diagram of a first acquiring unit provided by embodiments of the present invention. Referring to FIG. 5, the first acquiring unit includes a first sending subunit 400 and a first receiving subunit 402, where the first sending subunit 400 is configured to send a measurement instruction to a radio access network device; and the first receiving subunit 402 is configured to receive a performance measurement parameter of a target cell in an energy efficiency measurement area in an energy efficiency measurement period and an energy consumption value of the radio access network device in the energy efficiency measurement period, which are reported by the radio access network device.

For the network management system provided by the embodiments of the present invention, the performance measurement parameter of the target cell in the energy efficiency measurement area includes any one or a combination of the following parameters:

a load parameter of the target cell in the energy efficiency measurement area, an inter-cell interference parameter among the target cells in the energy efficiency measurement area, or a service quality parameter of traffic flow of the target cell in the energy efficiency measurement area.

Among the performance measurement parameters, the load parameter of the target cell in the energy efficiency measurement area includes cell physical resource block usage or composite available capacity. The cell energy saving use case of the network with overlaid coverage is usually applied when the target cell is in a low load condition, and the load parameter of the target cell is a cell load measured value under the low load condition.

Among the performance measurement parameters, the inter-cell interference parameter among the target cells in the energy efficiency measurement area includes any one or a combination of the following parameters:

an OI, a HII, a RNTP, or an ABS.

Among the performance measurement parameters, the traffic quality of service parameter of the target cell in the energy efficiency measurement area includes any one or a combination of the following parameters:

A user throughput, a time delay, a packet loss rate, or the number of active users, wherein the user throughput may include any one or a combination of the following parameters: the worst 5% user throughput (5th percentile user throughput, reflecting the user throughput on the cell edge), the best 5% user throughput (95th percentile user throughput, reflecting the user throughput in the cell center), or the average user throughput (50th percentile user throughput).

In the network management system provided by the embodiments of the present invention, for the energy consumption value of the radio access network device to which the target cell belongs in the energy efficiency measurement area, an energy consumption monitoring module inside of the radio access network device may be used to collect and summate the energy consumption values of each component modules or parts of the radio access network device in the energy efficiency measurement period, and obtain a combination of measurement results of the total energy consumption of the whole machine of the radio access network device; or a method of using plug-in power/energy consumption testing instrument may be applied, and the energy consumption value of the radio access network device in the energy efficiency measurement period is directly measured and collected by the instrument.

Figure 6:
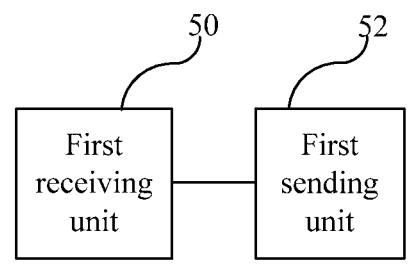
FIG. 6 is a schematic structural diagram of a radio access network device provided by embodiments of the present invention.

FIG. 6 is a structural diagram of a radio access network device provided by embodiments of the present invention. Referring to FIG. 6, the radio access network device includes a first receiving unit 50 and a first sending unit 52, wherein the first receiving unit 50 is configured to receive, by the radio access network device, a measurement instruction sent by a network management system; the first sending unit 52 is configured to acquire, by the radio access network device, a performance measurement parameter of a target cell in an energy efficiency measurement area in an energy efficiency measurement period and an energy consumption value of the radio access network device in the energy efficiency measurement period, and report the performance measurement parameter of the target cell in the energy efficiency measurement area in the energy efficiency measurement period and the energy consumption value of the radio access network device in the energy efficiency measurement period to the network management system.

The radio access network device provided by the embodiments of the present invention receives a measurement instruction sent by the network management system via the first receiving unit, and performs corresponding measurements to the performance measurement parameter of the target cell and the energy consumption value of the radio access network device based on this management instruction, then sends the measured performance measurement parameter and the energy consumption value to the network management system via the first sending unit. In this way, the energy consumption value of the radio access network device to which the target cell belongs can be accurately obtained through the radio access network device, so as to help the operator with learning about the actual gain brought by the cell energy saving use case.

Embodiments of the present invention provide a communication system, which includes the network management system and the radio access network device.

The network management system and the radio access network device have been given detailed description above, and will not be repeated herein.

In the communication system provided by the embodiments of the present invention, the network management system sends a measurement instruction to the radio access network device, the radio access network device receives the measurement instruction sent by the network management system, and performs corresponding measurements to the performance measurement parameter and the energy consumption value in the energy efficiency measurement area, then sends the measured energy efficiency parameter and the corresponding energy consumption value to the network management system, the network management system receives the performance measurement parameter and the corresponding energy consumption value, and calculates the corresponding energy efficiency parameter, so as to help the operator with learning about the actual gain brought by a cell energy saving use case.

The following gives detailed description to the communication system provided by the embodiments of the present invention with reference to FIG. 4, FIG. 5 and FIG. 6.

When the cell energy saving use case is turned on, the operator may perform measurement to the energy efficiency parameters of the target cell in the energy efficiency measurement area, and firstly the network management system sends the measurement instruction to the radio access network device.

Specifically, the measurement instruction is sent by the first sending subunit of the first acquiring unit in the network management system.

The measurement instruction may include the energy efficiency measurement period, the energy efficiency measurement area information, the performance measurement parameter information, and the energy efficiency measurement start instruction; or it may be pre-configured in the radio access network device the energy efficiency measurement period, the energy efficiency measurement area information, and the performance measurement parameter information.

The radio access network device receives the measurement instruction through the first receiving unit, and performs corresponding measurements according to the measurement instruction, and sends the measured performance measurement parameter and the corresponding energy consumption value to the network management system via the first sending unit. The network management system receives the performance measurement parameter and the corresponding energy consumption value through the first receiving subunit, and performs calculation via the second acquiring unit according to the performance measurement parameter and the corresponding energy consumption value, in this way, the energy efficiency parameters of the cell energy saving use case can be obtained, so as to help the operator with learning about the actual gain brought by the cell energy saving use case.

The method for acquiring an energy efficiency parameter of a network with overlaid coverage provided by the embodiments of the present invention is implemented based on two cell energy saving use cases, and the energy efficient measurement ranges of the two cell energy saving use cases are different.

Figure 7:
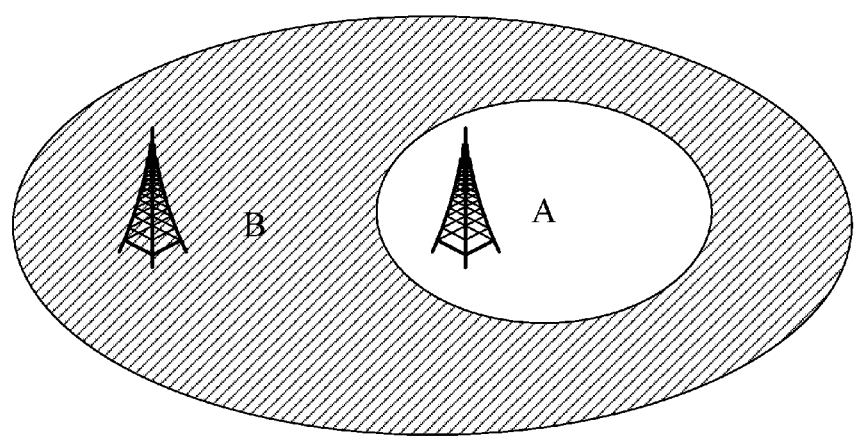
FIG. 7 is a range of an energy efficiency measurement area of an energy saving use case for a cell overlaid.
Figure 8:
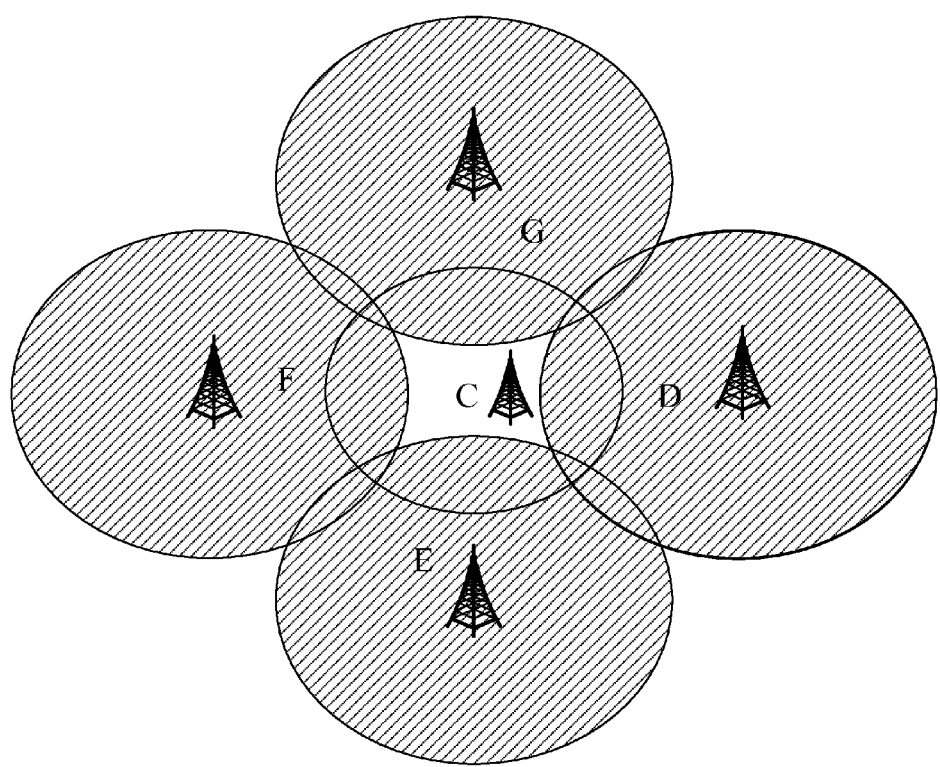
FIG. 8 is a range of an energy efficiency measurement area of an energy saving use case for a capacity limited network.

FIG. 7 shows a range of an energy efficiency measurement area of an energy saving use case for a cell overlaid, and the range of the energy efficiency measurement includes cell A which is performing energy saving, and one or more cells B, which provides coverage support for the energy saving cell. FIG. 8 shows a range of an energy efficiency measurement area of an energy saving use case for a capacity limited network, the range of the energy efficiency measurement includes the whole area in FIG. 8, in which cell C performs an energy saving compensation operation, and cell D, cell E, cell F and cell G perform an activation or deactivation operation of the energy saving.

The energy efficiency parameter measurement of a network with overlaid coverage is performed in the range of the energy efficiency measurement area. For example, in the scenario of cell overlaid, it needs to measure the overall energy consumption of the cell which performs energy saving and the cell which provides coverage support, as well as to measure the performance measurement parameter of the target cell in the measurement area, for example the load parameters of the cell which performs energy saving cell and the cell which provides coverage support.

In the method for acquiring the energy efficiency parameter of the network with overlaid coverage provided by the embodiments of the present invention, for the load parameter of the target cell, one of the performance measurement parameters, in assessing the energy efficiency of the network with overlaid coverage, the load of the target cell needs to be taken into account, that is to say, the energy consumption of the target cell under different load conditions needs to be taken into account. The load condition of the cell is divided into low load, medium load, and high load in the 3GPP specification. To determine which load condition a cell is in, an actually measured load value of the cell and a preset load threshold are compared. For example, when the actually measured load value of the cell is lower than a load threshold 1, the cell is determined to be in a low load condition; when the actually measured load value of the cell is higher than or equal to the load threshold 1 and lower than another load threshold 2, the cell is determined to be in a medium load condition; and when the actually measured load value of the cell is higher than or equal to the load threshold 2, the cell is determined to be in a high load condition.

In the method for acquiring the energy efficiency parameter of the network with overlaid coverage provided by embodiments of the present invention, concerning the traffic quality of service parameter of the target cell in the energy efficiency measurement area, before the cell energy saving is performed in the cell energy saving use case, the remaining small amount of the active users of the energy saving cell need to be transferred to the cell which provides energy saving coverage support, and a basic requirement of this transferring process is to ensure that there is no significant negative impact on the transferring users or the quality of service of the traffic because of the cell energy saving. Generally, if the energy saving cell and the cell which provides coverage support belong to a same wireless access technology, the capability of providing service or the quality of the service of the two cells are the same, then the traffic quality of service parameter need not be considered in this case. If the energy saving cell and the cell which provides coverage support belong to different wireless access technologies, then the traffic quality of service parameter is an essential energy efficiency parameter to be acquired.

For the LTE (Long Term Evolution) traffic, it may be divided into continuous traffic and bursty traffic. Different traffic types have the different traffic quality of service parameters. For the continuous traffic, this type of traffic demands high requirement to throughput and bandwidth, and the traffic quality of service parameter of this type includes a user throughput and/or a time delay; for the bursty traffic, this type of traffic does not demand high requirement to the throughput, but demands high requirement to packet loss rate of transmission, and the traffic quality of service parameter of this type includes a packet loss rate. In addition, for different continuous traffic or bursty traffic, active UE number may be taken as a general traffic parameter of quality of service that is irrelative with the traffic type.

For three types of the performance measurement parameter defined in the embodiments of the present invention: the load parameter of the target cell in the energy efficiency measurement area, the inter-cell interference parameter among the target cells in the energy efficiency measurement area, and the traffic quality of service parameter of the target cell in the energy efficiency measurement area, the embodiments of the present invention provide corresponding processes for measuring the energy efficient parameters.

In the above embodiments of the present invention, when the network management system performs measurement to energy efficient parameters of a target cell in an the energy efficiency measurement area, it may create a performance measurement task, and then send a measurement instruction to the radio access network according to the performance measurement task, in order to acquire the performance measurement parameter of the target cell in the energy efficiency measurement area. Meanwhile the network management system also acquires the energy consumption value of the radio access network device to which the target cell belongs in the same energy efficiency measurement area in the same energy efficiency measurement period, and finally calculates the energy efficiency KPI of the energy efficiency measurement area of the network with overlaid coverage according to the above measurement result of the performance measurement parameter of the target cell and the energy consumption value of the radio access network device to which the target cell belongs. Specifically, the energy efficiency KPI may be expressed as an energy consumption value under the condition of one type of performance measurement parameter, and has the following several forms:

Form 1 is that the energy efficiency KPI of the energy efficiency measurement area may be the energy consumption value under the corresponding load level of this area. To be specific, it is a ratio of the overall energy consumption value of the radio access network device in the energy efficiency measurement area to a sum of the cell load of the cells in the energy efficiency measurement area.

Form 2 is that the energy efficiency KPI of the energy efficiency measurement area may be the energy consumption value under the inter-cell interference parameter among the corresponding cells of this area. To be specific, it is a ratio of the overall energy consumption value of the radio access network device in the energy efficiency measurement area to the measurement result of the inter-cell interference parameter among the cells in the measurement area.

Form 3 is that the energy efficiency KPI of the energy efficiency measurement area may be the energy consumption value under the corresponding traffic quality of service parameter of this area. To be specific, it is a ratio of the overall energy consumption value of the radio access network device in the energy efficiency measurement area to the measurement result of the traffic quality of service (user throughput, time delay, packet loss rate, or number of active users) in the energy efficiency measurement area.

Alternatively, the energy efficiency KPI may also be expressed as a result of a corresponding performance measurement parameter per energy consumption output, and has the following several forms:

Form 1 is the cell load supported per unit of energy consumption. To be specific, it is the ratio of the sum of the measured cell load of the cells in the energy efficiency measurement area to the energy consumption generated by the radio access network device in the measurement area.

Form 2 is the measured value under the inter-cell interference parameter among the cells per energy consumption in the energy efficiency measurement area. To be specific, it is the ratio of the measurement result of the inter-cell interference parameter among the cells in the energy efficiency measurement area to the energy consumption generated by the radio access network device in the measurement area.

Form 3 is the measured value of the traffic quality of service parameter of a cell per energy consumption in the energy efficiency measurement area. To be specific, it is the ratio of the measurement result of the traffic quality of service parameter in the energy efficiency measurement area to the energy consumption generated by the radio access network device in the measurement area Finally, it should be noted that the foregoing embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to some technical features in the technical solutions; however, such modifications or replacements do not cause the essence of corresponding technical solutions to depart from the spirit and scope of the technical solutions of the embodiments of the present invention.

What is claimed is:

1. A method for acquiring an energy efficiency parameter of a network with overlaid coverage, comprising:
    acquiring, by a first acquiring unit in a network management system, a performance measurement parameter of a target cell in an energy efficiency measurement area and an energy consumption value of a radio access network device to which the target cell in the energy efficiency measurement area belongs; and
    acquiring, by a second acquiring unit in the network management system, an energy efficiency parameter of the energy efficiency measurement area according to the performance measurement parameter of the target cell in the energy efficiency measurement area and the energy consumption value of the radio access network device to which the target cell in the energy efficiency measurement area belongs.

2. The method for acquiring the energy efficiency parameter of the network with overlaid coverage according to claim 1, wherein the acquiring, by the first acquiring unit in the network management system, the performance measurement parameter of the target cell in the energy efficiency measurement area and the energy consumption value of the radio access network device to which the target cell in the energy efficiency measurement area belongs, comprises:
    sending, by a first sending subunit of the first acquiring unit, a measurement instruction to the radio access network device, wherein the measurement instruction instructs the radio access network device to measure the performance measurement parameter of the target cell in the energy efficiency measurement area in the energy efficiency measurement period, and the energy consumption value of the radio access network device in the energy efficiency measurement period; and
    receiving, by a first receiving subunit of the first acquiring unit, the performance measurement parameter of the target cell in the energy efficiency measurement area in the energy efficiency measurement period and the energy consumption value of the radio access network device in the energy efficiency measurement period reported by the radio access network device.

3. The method for acquiring the energy efficiency parameter of the network with overlaid coverage according to claim 1, wherein the performance measurement parameter of the target cell in the energy efficiency measurement area comprises one or a combination of the following parameters:
    a load parameter of the target cell in the energy efficiency measurement area, an inter-cell interference parameter among the target cells in the energy efficiency measurement area, or a traffic quality of service parameter of the target cell in the energy efficiency measurement area.

4. The method for acquiring the energy efficiency parameter of the network with overlaid coverage according to claim 3, wherein the load parameter of the target cell in the energy efficiency measurement area comprises cell physical resource block usage or composite available capacity.

5. The method for acquiring the energy efficiency parameter of the network with overlaid coverage according to claim 3, wherein the inter-cell interference parameter among the target cells in the energy efficiency measurement area comprises one or a combination of the following parameters:
    an uplink interference overload indicator parameter, an uplink high interference indicator parameter, a relative narrowband transmit power indicator parameter or an almost blank subframe parameter.

6. The method for acquiring the energy efficiency parameter of the network with overlaid coverage according to claim 3, wherein the traffic quality of service parameter of the target cell in the energy efficiency measurement area comprises one or a combination of the following parameters:
    a user throughput, a time delay, a packet loss rate, or number of active users.

7. A network management system, comprising:
    a first acquiring unit, configured to acquire a performance measurement parameter of a target cell in an energy efficiency measurement area and an energy consumption value of a radio access network device to which the target cell in the energy efficiency measurement area belongs; and
    a second acquiring unit, configured to acquire an energy efficiency parameter of the energy efficiency measurement area according to the performance measurement parameter of the target cell in the energy efficiency measurement area and the energy consumption value of the radio access network device to which the target cell in the energy efficiency measurement area belongs.

8. The network management system according to claim 7, wherein the first acquiring unit comprises:
    a first sending subunit, configured to send a measurement instruction to the radio access network device, the measurement instruction instructs the radio access network device to measure the performance measurement parameter of the target cell in the energy efficiency measurement area in an energy efficiency measurement period and the energy consumption value of the radio access network device in the energy efficiency measurement period; and
    a first receiving subunit, configured to receive the performance measurement parameter of the target cell in the energy efficiency measurement area in the energy efficiency measurement period and the energy consumption value of the radio access network device in the energy efficiency measurement period reported by the radio access network device.

9. The network management system according to claim 7, wherein the performance measurement parameter of the target cell in the energy efficiency measurement area comprises one or a combination of the following parameters:

a load parameter of the target cell in the energy efficiency measurement area, an inter-cell interference parameter among target cells in the energy efficiency measurement area, or a traffic quality of service parameter of the target cell in the energy efficiency measurement area.

10. The network management system according to claim 9, wherein the load parameter of the target cell in the energy efficiency measurement area comprises cell physical resource block usage or composite available capacity.

11. The network management system according to claim 9, wherein the inter-cell interference parameter among the target cells in the energy efficiency measurement area comprises one or a combination of the following parameters:

an uplink interference overload indicator parameter, an uplink high interference indicator parameter, a relative narrowband transmit power indicator parameter or an almost blank subframe parameter.

12. The network management system according to claim 9, wherein the traffic quality of service parameter of the target cell in the energy efficiency measurement area comprises one or a combination of the following parameters:

a user throughput, a time delay, a packet loss rate, or number of active users.

13. A radio access network device, comprising:

a first receiving unit, configured to receive a measurement instruction sent by a network management system, the measurement instruction instructs the radio access network device to measure a performance measurement parameter of a target cell in an energy efficiency measurement area in an energy efficiency measurement period and an energy consumption value of the radio access network device in the energy efficiency measurement period; and a first sending unit, configured to acquire the performance measurement parameter of the target cell in the energy efficiency measurement area in the energy efficiency measurement period and the energy consumption value in the energy efficiency measurement period, and report the performance measurement parameter of the target cell in the energy efficiency measurement area in the energy efficiency measurement period and the energy consumption value of the radio access network device in the energy efficiency measurement period to the network management system.

14. The radio access network device according to claim 13, wherein the measurement instruction comprises the energy efficiency measurement period, performance measurement parameter information and energy consumption measurement information; or the measurement instruction comprises the energy efficiency measurement period, the performance measurement parameter information and the energy consumption measurement information which are pre-configured in the radio access network device.

15. The radio access network device according to claim 13, wherein the performance measurement parameter information comprises one or a combination of the following parameters which need to be measured:

a load parameter of the target cell in the energy efficiency measurement area, an inter-cell interference parameter among target cells in the energy efficiency measurement area, or a traffic quality of service parameter of the target cell in the energy efficiency measurement area.

16. The radio access network device according to claim 15, wherein the load parameter of the target cell in the energy efficiency measurement area comprises cell physical resource block usage or composite available capacity.

17. The radio access network device according to claim 15, wherein the inter-cell interference parameter among the target cells in the energy efficiency measurement area comprises one or a combination of the following parameters:

an uplink interference overload indicator parameter, an uplink high interference indicator parameter, a relative narrowband transmit power indicator parameter or an almost blank subframe parameter.

18. The radio access network device according to claim 15, wherein the traffic quality of service parameter of the target cell in the energy efficiency measurement area comprises one or a combination of the following parameters:

a user throughput, a time delay, a packet loss rate, or number of active users.

\* \* \* \* \*